(12) United States Patent       (10) Patent No.:     US 12,582,914 B2
Kurabayashi                          (45) Date of Patent:      Mar. 24, 2026

(54) GAME MANAGEMENT DEVICE, GAME MANAGEMENT METHOD, AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice:   Subject to any disclaimer, the term of this patent is extended or adjusted under 35 U.S.C. 154(b) by 323 days.

(21) Appl. No.: 18/465,467

(22) Filed:   Sep. 12, 2023

(65)                Prior Publication Data

US 2024/0033645 A1      Feb. 1, 2024

Related U.S. Application Data

(63) Continuation      of      application      No. PCT/JP2022/009351, filed on Mar. 4, 2022.

(30)        Foreign Application Priority Data

Mar. 17, 2021      (JP) ................................. 2021-043722

(51) Int. Cl.
    *A63F 13/795*        (2014.01)
    *A63F 13/53*         (2014.01)
(52) U.S. Cl.
    CPC ............ *A63F 13/795* (2014.09); *A63F 13/53* (2014.09)
(58) Field of Classification Search
    CPC ....... A63F 13/795; A63F 13/53; A63F 13/847
    USPC .......................................................... 463/41
    See application file for complete search history.

(56)                References Cited

U.S. PATENT DOCUMENTS

| | | | |
|---|---|---|---|
| 8,795,088 B2 | 8/2014 | Kusano et al. | |
| 9,149,725 B2 * | 10/2015 | He ......................... | A63F 13/795 |
| 11,192,032 B2 * | 12/2021 | Degarmo ................ | A63F 13/55 |
| 2007/0191099 A1 * | 8/2007 | Hought ................. | A63F 13/795 |
| | | | 463/42 |

(Continued)

FOREIGN PATENT DOCUMENTS

| | | |
|---|---|---|
| JP | 2011-98013 A | 5/2011 |
| JP | 2013-111281 A | 6/2013 |

(Continued)

OTHER PUBLICATIONS

Mitt Gaming, "How to Form a Tribe Alliance in ARK: Survival Evolved", Mar. 12, 2016, youtube, https://www.youtube.com/watch?v=fBGQgq5BEME (Year: 2016).*

(Continued)

*Primary Examiner* — Michael A Cuff
(74) *Attorney, Agent, or Firm* — Osha Bergman Watanabe & Burton LLP

(57)                ABSTRACT

A game management device includes a storage unit that stores a list of a plurality of groups constituted of a member. The device further includes a merging-subject search unit that searches for various groups that satisfy a merging condition and that can be mutually merged from among groups with which the numbers of members have not reached an upper limit set in advance in a game and that are in a state in which it is possible to add a member. The device further includes a proposition unit that presents a proposal for merging to the groups that can be mutually merged and that accepts replies to the proposal. The device further includes a merging unit that merges the groups to generate a single group in the case where replies to the effect of accepting the proposal have been received from the groups.

8 Claims, 13 Drawing Sheets

(56)          References Cited

U.S. PATENT DOCUMENTS

| 2013/0137522 | A1 |  | 5/2013 | Kusano et al. |
| 2013/0191394 | A1 | * | 7/2013 | Bradley ................. G06Q 50/01 |
|  |  |  |  | 707/738 |
| 2014/0323228 | A1 |  | 10/2014 | Kusano et al. |
| 2015/0080130 | A1 | * | 3/2015 | Tanibuchi ............... A63F 13/65 |
|  |  |  |  | 463/31 |
| 2017/0252657 | A1 | * | 9/2017 | Kruglick ................ G06Q 30/02 |
| 2019/0091577 | A1 | * | 3/2019 | Reiche, III ............ A63F 13/795 |

FOREIGN PATENT DOCUMENTS

| JP |  | 2017-429 | A | 1/2017 |
| JP | 2019-195374 | A | 11/2019 |
| JP |  | 6752345 | B1 | 9/2020 |

OTHER PUBLICATIONS

International Search Report issued in PCT/JP2022/009351 on May 10, 2022 (7 pages).

Written Opinion of the International Searching Authority issued in PCT/JP2022/009351 on May 10, 2022 (4 pages).

Retro; "Phantasy Star Online 2"; Dengeki PlayStation, vol. 20, No. 21; May 29, 2014; pp. 196-199 (5 pages).

Nintendo; "Let's start now! How to play 'Fortnite Battle Royale' from scratch"; Aug. 10, 2018; Retrieved from the Internet on Feb. 5, 2021: URL :<https://topics.nintendo.co.jp/article/f5e9088e-95fb-11e8-b123-063b7ac45a6d> (11 pages).

* cited by examiner

FIG. 2

INPUT/OUTPUT
INTERFACE — 3A

5A

PROCESSOR

MEMORY

PERIPHERAL
CIRCUIT

GROUP LIST

| GROUP IDENTIFICATION INFORMATION | NUMBER OF MEMBERS | GROUP IDENTIFICATION INFORMATION | | | | | MEMBER | | | |
| | | GROUP NAME | AVERAGE LEVEL | LANGUAGE USED | ... | LEADER | MEMBER 01 | MEMBER 02 | ... | ... |
| G001312 | 7 | CYCYGA | 5 | JAPANESE | ... | M17218 | M00121 | M19191 | ... | ... |
| G000712 | 3 | PREPREP | 3 | ENGLISH | ... | M77112 | M33181 | M21721 | ... | ... |
| · · · · | · · · · | · · · · | · · · · | · · · · | · · · · | · · · · | · · · · | · · · · | · · · · | · · · · |

FIG. 5

USER LIST

| USER IDENTIFICATION INFORMATION | USER ATTRIBUTE INFORMATION | | | | | |
|---|---|---|---|---|---|---|
| | KIND OF PLAYER CHARACTER | LEVEL | RANK | STRENGTH VALUE | ITEM | . . . |
| M17218 | * * * | 6 | C | 118 | KNIFE OF LIGHT, * * * * | |
| . . . . | . . . . | . . . . | . . . . | . . . . | . . . . | . . . . |

FIG. 6

GROUP ENTRY CONDITION

| GROUP IDENTIFICATION INFORMATION | CONDITION |
|---|---|
| G001312 | "LEVEL 4 OR HIGHER" AND "LANGUAGE USED: JAPAN" AND "REGION: JAPAN" |
| G000712 | "LANGUAGE USED: ENGLISH" |
| ⋮ | ⋮ |

FIG. 8

MU-KUN OF CYCYGA

THE FOLLOWING GROUPS HAVE BEEN FOUND BY
SEARCHING AS SUBJECTS OF MERGING.

| GROUP NAME | AVERAGE LEVEL | NUMBER OF MEMBERS | LANGUAGE USED | DETAIL INFORMATION | SELECT |
|---|---|---|---|---|---|
| MINMIN | 4 | 2 | JAPANESE | DETAILS | ◉ |
| BANANAN | 6 | 5 | JAPANESE | DETAILS | ○ |
| . . . . | . . . . | . . . . | . . . . | . . . . | . . . . . |

OFFER MERGING          DO NOT MERGE WITH ANY

FIG. 9

KAN-CHAN OF MINMIN

THE FOLLOWING OFFER FOR MERGING HAS ARRIVED.

| GROUP NAME | AVERAGE LEVEL | NUMBER OF MEMBERS | LANGUAGE USED | DETAIL INFORMATION |
|---|---|---|---|---|
| CYCYGA | 5 | 7 | JAPANESE | DETAILS |

ACCEPT     REJECT

FIG. 11

MU-KUN OF CYCYGA

EFFECTIVE PERIOD
OF PROPOSAL
REMAINING 5:19

THE FOLLOWING GROUP HAS BEEN FOUND BY
SEARCHING AS A SUBJECT OF MERGING.

| GROUP NAME | AVERAGE LEVEL | NUMBER OF MEMBERS | LANGUAGE USED | DETAIL INFORMATION |
|---|---|---|---|---|
| MINMIN | 4 | 2 | JAPANESE | DETAILS |

ACCEPT    REJECT

FIG. 12

KAN-CHAN OF MINMIN

EFFECTIVE PERIOD
OF PROPOSAL
REMAINING 3:11

THE FOLLOWING GROUP HAS BEEN FOUND BY
SEARCHING AS A SUBJECT OF MERGING.

| GROUP NAME | AVERAGE LEVEL | NUMBER OF MEMBERS | LANGUAGE USED | DETAIL INFORMATION |
|---|---|---|---|---|
| CYCYGA | 5 | 7 | JAPANESE | DETAILS |

ACCEPT     REJECT

GAME MANAGEMENT DEVICE, GAME MANAGEMENT METHOD, AND PROGRAM

TECHNICAL FIELD

The present invention relates to game management devices, game management methods, and programs.

BACKGROUND ART

As online games become common, the type of game in which a large number of players participate (hereinafter a "multiplayer play game") is gaining popularity. An example multiplayer play game is a battle royale game in which a large number of players participate. The battle royale game provides 20 vs 20 or 50 vs 50 team battles, a mode in which one hundred individual players play battles against each other for survival, etc. (see Non Patent Literature 1).

CITATION LIST

Non Patent Literature

NPL 1
"Now let's start! Understanding how to play 'Fortnite Battle' from scratch", [online], 10 Aug. 2018, Nintendo, [retrieved on 5 Feb. 2021], Internet <URL: https://topics.nintendo.co.jp/article/f5e9088e-95fb-11e8-b123-063b7ac45a6d>

SUMMARY OF INVENTION

Technical Problem

There are various methods of creating groups (sets of users) for participating in a multiplayer play game. Examples include static methods in which groups are formed in advance with names such as "guilds", "clans", "parties", or "squads", as well as dynamic methods in which temporary groups called "rooms" are created on a per-play basis. Furthermore, mechanisms for inviting users to participate in such rooms include a method in which connections among various users are formed in advance, a method in which users who have played battles together are presented in a list, and a method in which other users are invited at random.

In order to bring about variations in a game and to stably gather users irrespective of the period and time, the method in which temporary groups are created on a per-play basis is preferred. With this means, however, there are cases where it takes long time for a desired number of members to gather, which may result in a stress for users.

The present invention addresses the problem of providing a means for reducing the time taken before a desired number of members gather in a method of creating temporary groups on a per-play basis.

Solution to Problem

The present invention provides a game management device including:

a storage unit that stores a list of a plurality of groups constituted of one or more members;

a merging-subject search unit that searches for two or more of the groups that satisfy a merging condition and that can be mutually merged from among the groups with which the numbers of members have not reached an upper limit set in advance in a game and that are in a state in which it is possible to add a member;

a proposition unit that presents a proposal for merging to the two or more groups that can be mutually merged and that accepts replies to the proposal; and a merging unit that merges the two or more groups that can be mutually merged to generate the single group in the case where replies to the effect of accepting the proposal have been received from the two or more groups that can be mutually merged.

Furthermore, the present invention provides a game management method wherein a computer:

stores a list of a plurality of groups constituted of one or more members;

searches for two or more of the groups that satisfy a merging condition and that can be mutually merged from among the groups with which the numbers of members have not reached an upper limit set in advance in a game and that are in a state in which it is possible to add a member;

presents a proposal for merging to the two or more groups that can be mutually merged, and accepts replies to the proposal; and merges the two or more groups that can be mutually merged to generate the single group in the case where replies to the effect of accepting the proposal have been received from the two or more groups that can be mutually merged.

Furthermore, the present invention provides a program for causing a computer to function as:

a storage means for storing a list of a plurality of groups constituted of one or more members;

a merging-subject search means for searching for two or more of the groups that satisfy a merging condition and that can be mutually merged from among the groups with which the numbers of members have not reached an upper limit set in advance in a game and that are in a state in which it is possible to add a member;

a proposition means for presenting a proposal for merging to the two or more groups that can be mutually merged and for accepting replies to the proposal; and a merging means for merging the two or more groups that can be mutually merged to generate the single group in the case where replies to the effect of accepting the proposal have been received from the two or more groups that can be mutually merged.

Advantageous Effects of Invention

The present invention realizes a means for reducing the time taken before a desired number of members gather in a method of creating temporary groups on a per-play basis.

BRIEF DESCRIPTION OF DRAWINGS

FIG. 2 is a diagram showing an example hardware configuration of the game management device according to this embodiment.

FIG. 4 is a figure schematically showing an example of information that is processed by the game management device according to this embodiment.

FIG. 5 is a figure schematically showing an example of information that is processed by the game management device according to this embodiment.

FIG. 6 is a figure schematically showing an example of information that is processed by the game management device according to this embodiment.

FIG. 8 is an example display screen that is realized by the game management device according to this embodiment.

FIG. 9 is an example display screen that is realized by the game management device according to this embodiment.

FIG. 11 is an example display screen that is realized by the game management device according to this embodiment.

FIG. 12 is an example display screen that is realized by the game management device according to this embodiment.

DESCRIPTION OF EMBODIMENTS

First Embodiment

Overview

A game management device according to this embodiment creates groups for participating in a play by using a method of creating temporary groups on a per-play basis. The game management device creates groups by using a method of "mutually merging groups" in addition to a method of "participating in groups on a per-individual basis".

Figure 1:
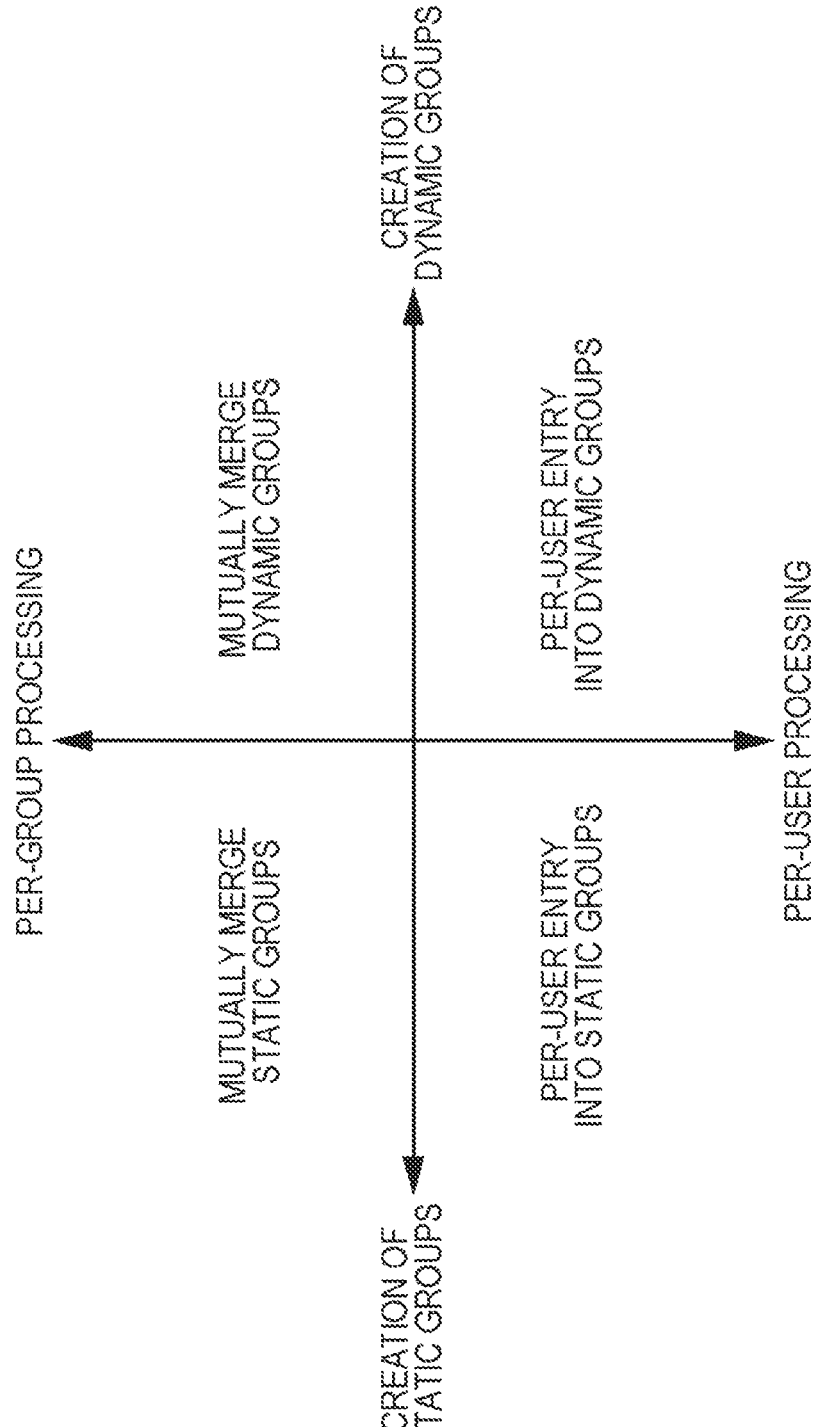
FIG. 1 is a figure for explaining features of a game management device according to this embodiment.

Now, the technical features of this embodiment will be described in comparison with existing technologies with reference to FIG. 1.

"Dynamic groups" in the figure are groups that are created temporarily on a per-play basis. Users who can play on each occasion gather to create temporary groups. Generally, the temporary groups are dissolved upon the end of a play.

"Static groups" shown in the figure are groups that are created in advance regardless of the timing of the execution of a play. For example, static groups are created from family members, mutual friends, mutual acquaintances, or the like. Furthermore, such static groups serve as units for participating in a play as well as units for merging with other static groups. Note that static groups are not dissolved upon the end of a play, and generally, the static groups are dissolved, for example, in response to the input of an instruction from a user.

The technology of this embodiment is a combination of a technology with which users enter dynamic groups on a per-user basis and a technology with which dynamic groups are mutually merged, which are shown in the figure.

Technologies with which users enter static groups on a per-user basis, technologies with which static groups are mutually merged, and technologies with which users enter dynamic groups on a per-user basis have hitherto been known. However, there has been no technology for mutually merging dynamic groups. Thus, there has been no technology in which a technology with which users enter dynamic groups on a per-user basis and a technology with which dynamic groups are mutually merged are combined.

"Hardware Configuration"

Next, the hardware configuration of the game management device will be described. Individual functional units provided in the game management device according to this embodiment are realized by an arbitrary combination of hardware and software, mainly including a central processing unit (CPU) of an arbitrary computer, a memory thereof, programs loaded in the memory, a storage unit storing the program, such as a hard disk (which can store programs already stored before the shipping of the device, as well as programs stored in a storage medium, such as a compact disc (CD), or downloaded from a server or the like on the Internet), and a network connection interface. Furthermore, it would be understood to a person skilled in the art that there are various modifications for the method and device for realizing the functional units.

Figure 2:
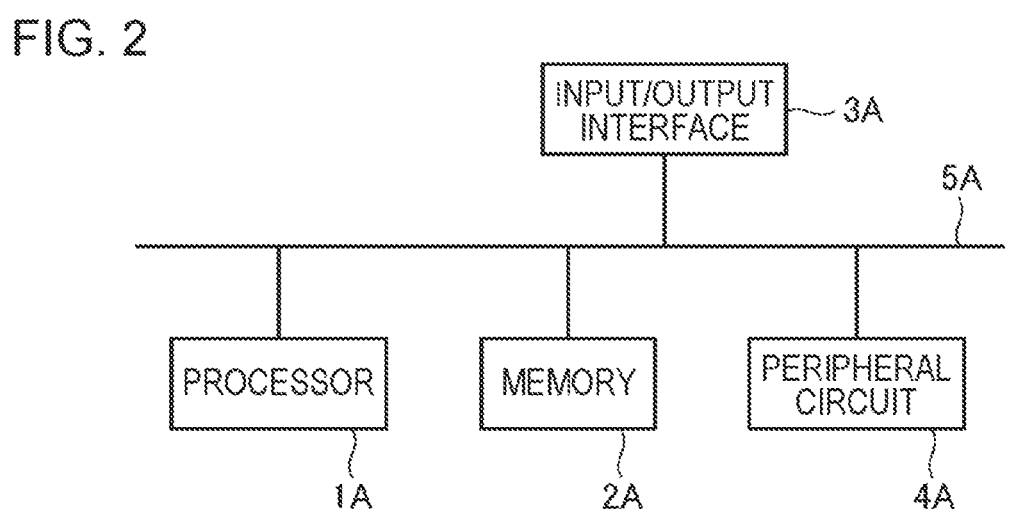

FIG. 2 is a block diagram showing an example hardware configuration of the game management device. As shown in FIG. 2, the game management device includes a processor 1A, a memory 2A, an input/output interface 3A, a peripheral circuit 4A, and a bus 5A. The peripheral circuit 4A includes various modules. Note that the individual devices need not include the peripheral circuit 4A.

Note that the game management device may be constituted of a plurality of physically and/or logically separated devices. In this case, each of the devices may include the hardware configuration described above. Alternatively, the game management device may be constituted of a physically and logically single device.

The bus 5A is a data transmission path for the processor 1A, the memory 2A, the peripheral circuit 4A, and the input/output interface 3A to send data to and receive data from each other. The processor 1A is a computational processing device, such as a CPU or a graphics processing unit (GPU). The memory 2A is a memory such as a random access memory (RAM) or a read only memory (ROM). The input/output interface 3A includes interfaces for obtaining information from input devices, external devices, external servers, external sensors, etc., interfaces for outputting information to output devices, external devices, external servers, etc., and so forth. Example input devices include a keyboard, a mouse, and a microphone. Example output devices include a display, a speaker, a printer, and a mailer. The processor 1A can issue instructions to the individual modules and can perform computations on the basis of the results of computations by the individual modules.

"Functional Configuration"

Figure 3:
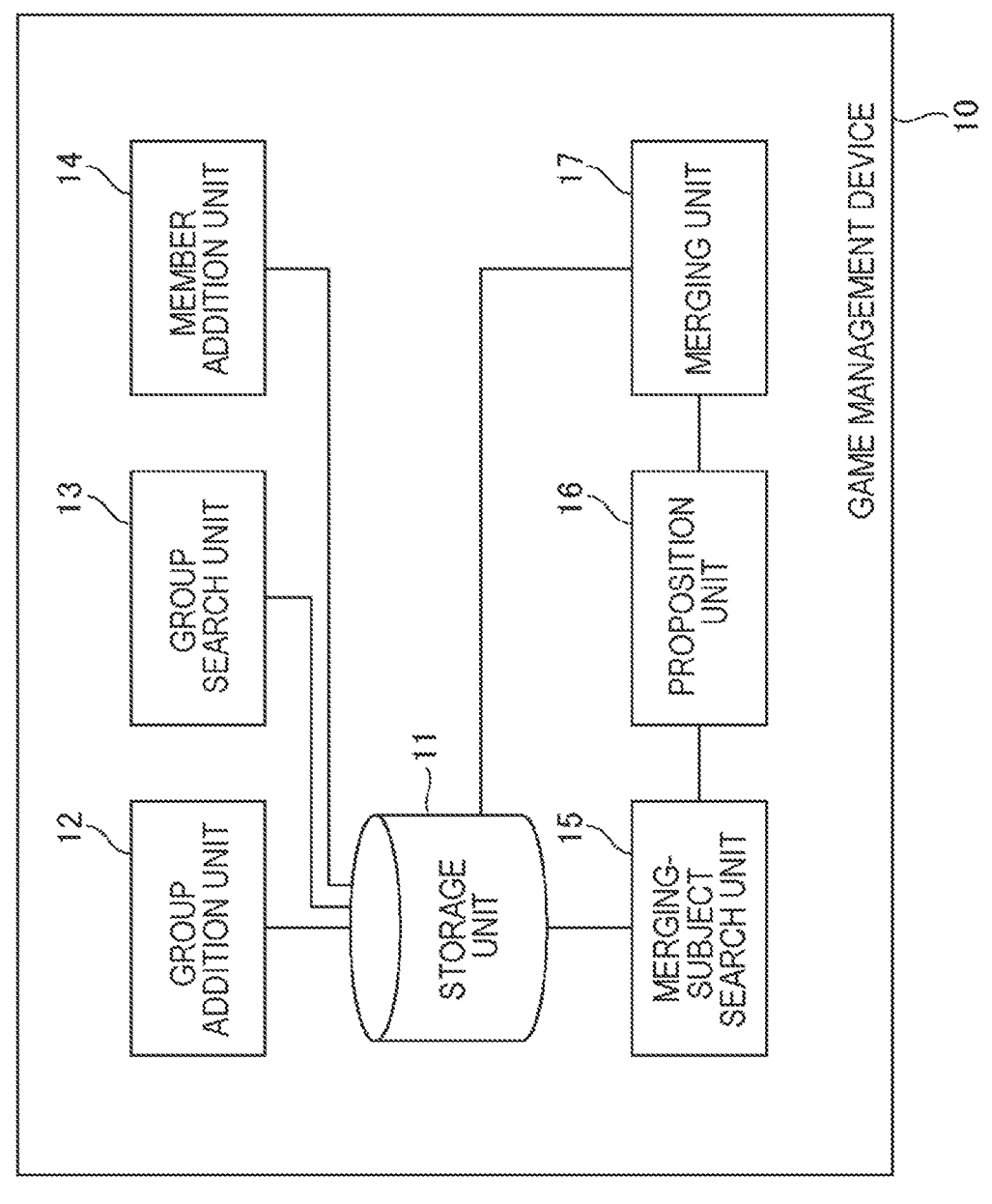
FIG. 3 is an example functional block diagram of the game management device according to this embodiment.

Next, the functional configuration of the game management device will be described. FIG. 3 shows an example functional block diagram of a game management device 10. As shown in the figure, the game management device 10 includes a storage unit 11, a group addition unit 12, a group search unit 13, a member addition unit 14, a merging-subject search unit 15, a proposition unit 16, and a merging unit 17.

These functional units realize the following kinds of processing, which will each be described below.

Data management

Processing for newly creating a dynamic group

Processing for per-user entry into a dynamic group

Processing for mutually merging dynamic groups

—Data Management—

Data management is realized by the storage unit 11. The storage unit 11 stores a list of a plurality of groups constituted of one or more members (hereinafter a "group list"). In the group list, groups that exist at the current time are registered. That is, a group is registered in the group list upon the creation of the group, and the group is deleted from the group list upon the dissolution of the group (the end of a play).

FIG. 4 schematically shows an example group list. In the example shown, "group identification information", "number of members", "group attribute information", and "members" are associated with each other. Note that other information may further be registered in the group list.

"Group identification information" is information for distinguishing a plurality of groups from each other. For example, the game management device 10 issues group identification information to each group according to a predefined rule.

"Number of members" indicates the number of members who belong to each group at the current timing. Note that the number of members may be a part of the group attribute information.

"Group attribute information" is attribute information of each group. The group attribute information includes a set of items of information that can be obtained from the game system, such as the kinds of player characters used by the individual members, player levels, ranks or strength values calculated by the game system according to the skillfulness of the players, and items commonly owned by the individual members. Furthermore, the group attribute information may include a group name determined by the members, the average level of the group (e.g., the average value of self-declared levels or the levels of constituent members), a language used for communication among the members, etc.

"Members" is information indicating the members who belong to each group at the current time. In the case of the example shown in the figure, user identification information is dictated in this field.

Note that the storage unit 11 may store a user list such as the one shown in FIG. 5 in addition to the group list described above. In the user list, users who have been registered as users and who can participate in the game are registered. In the example shown, "user identification information" and "user attribute information" are associated with each other. Note that other information may further be registered in the user list.

"User identification information" is information for distinguishing a plurality of users from each other. For example, the game management device 10 issues user identification information to each user according to a predefined rule.

"User attribute information" is user data that can be collated with the group attribute information, and is type-compatible with the group attribute information. The user attribute information is a set of items of information that can be obtained from the game system, such as the kind of player character used, a player level, a rank or strength value calculated by the game system according to the skillfulness of the player, and items owned.

—Processing for Newly Creating a Dynamic Group—

Processing for newly creating a dynamic group is realized by the group addition unit 12 in FIG. 3. The group addition unit 12 creates a new group on the basis of a user operation, and registers the newly created group in the group list.

Each user performs prescribed user operations via a user terminal having a communication function, such as a smartphone, a tablet, a personal computer, a game machine, a smart watch, or a mobile phone. The user terminal carries out communication with the game management device 10 to provide the user with prescribed game functions in cooperation with the game management device 10.

For example, a user wishing to create a group while playing a central role performs an operation for newly creating a group via a user terminal. In response to this operation, the group addition unit 12 newly adds the group to the group list.

For example, the group addition unit 12 issues new group identification information to the group, and adds the group identification information to the group list (see FIG. 4). Furthermore, the group addition unit 12 registers "1" in the field of the number of members in the group list. Then, the group addition unit 12 registers the user identification information of the user in the leader field of the member field.

Furthermore, the user who has newly created a group may be allowed to determine and register a group entry condition for entering the group. The group entry condition is stored in the storage unit 11.

FIG. 6 schematically shows an example of group entry conditions. Group entry conditions are type-compatible with the group attribute information. That is, a group entry condition is defined by using, for example, the kind of player character used, a player level, a rank or strength value calculated by the game system according to the skillfulness of a player, an item owned, etc. A group entry condition may also be defined by using a language used, a region of presence, the number of past participations in the game, the sex, an age layer, the kind of terminal used, etc. as well. Note that the content of a group entry condition, as well as items to be used in defining a group entry condition, are not limited to those described above.

Furthermore, how group entry conditions are to be handled may vary, not being subject to any particular limitation. For example, the configuration may be such that a user who does not satisfy a group entry condition set to each group is never allowed to enter the group. In this case, for example, the game is configured such that a user who does not satisfy a group entry condition is not allowed to apply for the entry into the corresponding group. The game management device 10 is provided with a function for checking whether or not each user satisfies the group entry condition of each group, i.e., a function for collating the group entry condition with the user attribute information to determine whether or not to permit the entry of the user into the group.

Alternatively, the configuration may be such that the group entry condition is information serving as a reference when each user searches for a group to enter, allowing even users who does not satisfy the group entry condition to enter the group. In this case, for example, the game is configured such that even a user who does not satisfy a group entry condition is allowed to apply for the entry into the corresponding group, allowing the user to enter the group depending on a decision by the leader of the group.

—Processing for Per-User Entry into a Dynamic Group—

Processing for per-user entry into a dynamic group is realized by the group search unit 13 and the member addition unit 14 in FIG. 3. The group search unit 13 searches for prescribed groups from among groups that have been registered in the group list (see FIG. 4), whose numbers of members have not reached an upper limit preset in the game, and that are in a state in which members can be added (hereinafter "recruiting groups"). This function of the group search unit 13 is provided for users who search for groups to enter. For example, the group search unit 13 searches for groups matching a search condition from among recruiting groups registered in the group list with reference to the group attribute information registered in the group list.

The search condition may be created by each user. For example, a user wishing to search for a group to enter performs a group searching operation via a user terminal. In this operation, the user creates a search condition, and enters an instruction for searching for groups that satisfy the search condition created. In response to the instruction entered, the group search unit 13 searches for groups that satisfy the search condition. An example search condition is "average level: 3 or higher and language used: Japanese". Alternatively, it may be allowed to search for a desired group by using a group name as a search condition, such as "group name: cycyga".

Alternatively, the search condition may be automatically created by the group search unit 13 on the basis of the user attribute information of each user. For example, a user wishing to search for a group to enter enters an instruction for searching for groups. In response to the instruction entered, the group search unit 13 creates a search condition on the basis of the user attribute information of the user, and search for groups that satisfy the search condition created. Details of processing for creating a search condition on the basis of the user attribute information may vary, not being subject to any particular limitation.

The upper limit to the number of members in each group is predefined in the game. It is not allowed to include members beyond this upper limit. Note that the number of members reaching this upper limit may be a condition for starting a play; however, this feature is not necessarily required.

The entry of a new member into a group may be allowed only with groups before starting a play, or may be allowed with groups during a play in addition to groups before starting a play. In the former case, only groups before starting a play may become recruiting groups. Meanwhile, in the latter case, groups before starting a game as well as groups during a play may become recruiting groups.

The group search unit 13 transmits the result of searching to the user terminal. Then, the user terminal displays the result of searching.

The member addition unit 14 adds and registers a new member to a group registered in the group list (see FIG. 4).

For example, a user who has performed a group search via the function provided by the group search unit 13 performs an operation for selecting a group to enter from the result of searching by the group search unit 13, displayed on the user terminal.

The member addition unit 14 may register the user identification information of the user as a member of the selected group into the group list in response to the selection operation.

Alternatively, the member addition unit 14 may query the leader of the group as to whether or not to permit the entry of the user in response to the selection operation. Then, the member addition unit 14 may register the user identification information of the user as a member of the selected group into the group list in response to the reception of a reply permitting entry from the leader of the group. The query and the reception of the reply are realized via all kinds of well-known technologies including functions within the game app and the transmission of an e-mail address.

—Processing for Mutually Merging Dynamic Groups—

Processing for mutually merging dynamic groups is realized by the merging-subject search unit 15, the proposition unit 16, and the merging unit 17 in FIG. 3.

The merging-subject search unit 15 searches for two or more groups that satisfy a merging condition and that can be mutually merged from among groups with which the numbers of members have not reached the upper limit preset in the game and that are in a state in which members can be added (recruiting groups).

The proposition unit 16 proposes merging to the two or more groups that can be mutually merged, found by searching by the merging-subject search unit 15, and accepts replies to the proposal. The proposition and the reception of the replies are realized via all kinds of well-known technologies including functions within the game app and the transmission of an e-mail address.

In the case where replies to the effect of accepting the proposal have been received from two or more groups that can be mutually merged, the merging unit 17 merges the two or more groups that can be mutually merged to create a single group.

An example flow of the processing will be described below in further detail with reference to a sequence chart in FIG. 7.

First, the leader of a first group, which is a recruiting group, enters, via a user terminal, an instruction for searching for groups that can be merged (S101). In response to the instruction entered, the merging-subject search unit 15 of the game management device 10 searches for groups that can be merged with the first group (S102).

The merging condition includes "(a first condition) the total number of members who belong to mutual groups is not greater than the upper limit". With this condition, it is possible to moderate the problem of the numbers of members after merging exceeding the upper limit set in the game.

Furthermore, the merging condition may be prepared by joining the abovementioned "first condition", via an AND condition, with "a second condition defined by using at least one of the group entry conditions and the attributes of the members who belong to the groups at the current timing".

Examples of the second condition include at least one or a plurality of the following conditions joined via logical operators:

"the degree of similarity between the mutual group entry conditions is greater than or equal to a reference value";

"the degree of similarity between mutual group attributes, calculated on the basis of user attributes of the members who belong to the groups at the current timing, is greater than or equal to a reference value";

"the degree of disparity between mutual group attributes, calculated on the basis of user attributes of the members who belong to the groups at the current timing, is greater than or equal to a reference value";

"a group attribute of one of the groups, calculated on the basis of user attributes of the members who belong to that group at the current timing, satisfies the group entry condition of the other group";

"the languages used, specified in the mutual group entry conditions, match";

"the regions of presence, specified in the mutual group entry conditions, match"; and "the types of terminals used, specified in the mutual group entry conditions, match".

The second condition may be predefined, or may be specified by a member (e.g., the leader) on a per-group basis.

There is no limitation to the method of calculating the degree of similarity between the mutual group entry conditions, and various methods may be adopted. Furthermore, as the method of calculating a group attribute on the basis of user attributes of the members who belong to the groups at the current timing, for example, it is possible to adopt a method of using, as a group attribute, a statistical value (the average, the mode, the maximum, the minimum, the median, or the like) of the levels, the numbers of participations in the game, the age layers, or the like of the members. Furthermore, there is no particular limitation to the method of calculating the degree of similarity between mutual group attributes, and various methods may be adopted.

With the condition "the degree of similarity between mutual group attributes, calculated on the basis of user attributes of the members who belong to the groups at the current timing, is greater than or equal to a reference value" among the examples of the second condition given above, it is possible to choose mutually similar groups as the subjects of merging. This makes it possible to create a group to which similar members belong. Meanwhile, with the condition "the degree of disparity between mutual group attributes, calculated on the basis of user attributes of the members who belong to the groups at the current timing, is greater than or equal to a reference value", it is possible to choose mutually dissimilar groups as the subjects of merging. This makes it possible to create a group to which members having various attributes belong.

After S102, the proposition unit 16 of the game management device 10 transmits the result of searching in S102, as well as a proposal for merging with "the groups that can be merged with the first group", indicated in the result of searching, to the user terminal of the leader of the first group (S103). Then, the user terminal of the leader of the first group displays these items of information (S104).

For example, a screen such as the one shown in FIG. 8 is displayed on the user terminal of the leader of the first group. The screen displays a list of one or more groups that satisfy the merging condition with the first group and that can be merged with the first group. Furthermore, the screen displays, as information concerning each group, the group name, the average level, the number of members at the current timing, the language used specified in the group entry condition, a link for browsing other detail information, etc. Note that the example screen is just an example, and other information concerning each group may be displayed.

Then, the user terminal of the leader of the first group accepts the input of replies to the proposal mentioned above (S105). Then, the user terminal of the leader of the first group transmits the replies accepted to the game management device 10 (S106). In the case where the leader of the first group wishes for merging with one of the groups displayed in the list, the leader of the first group selects that group, and performs an input for an offer of merging with the group. Meanwhile, in the case where the leader of the first group does not wish for merging with any one of the groups displayed in the list, the leader of the first group enters that effect.

Figure 7:
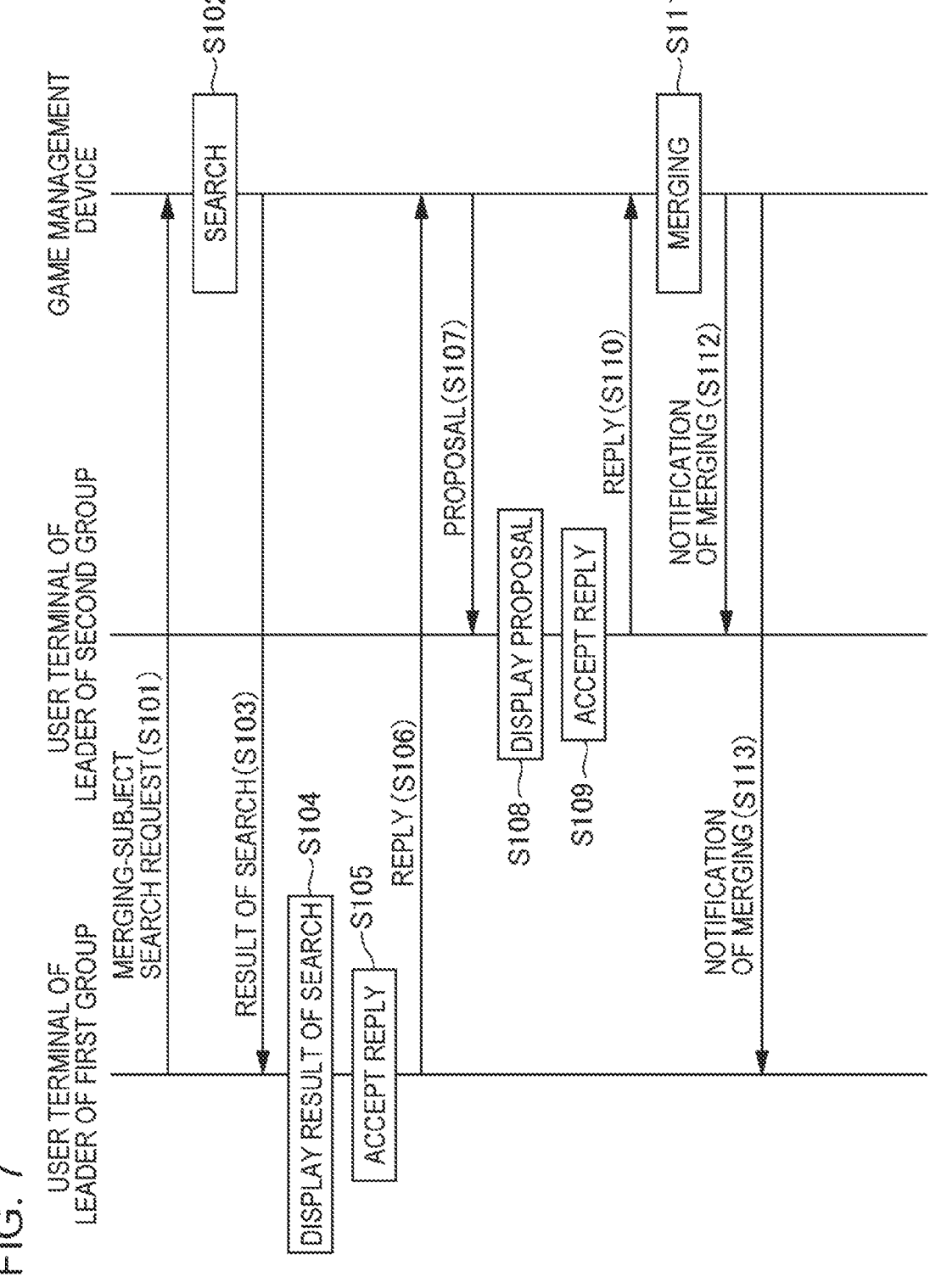
FIG. 7 is a sequence chart showing an example flow of processing by the game management device according to this embodiment.

Note that processing in and after S107 in FIG. 7 is processing in the case where the leader of the first group has performed an input for an offer of merging with one of the groups displayed in the list in S105. In the case where the leader of the first group has performed an input to the effect of not wishing for merging with any one of the groups displayed in the list in S105, the processing in and after S107 is not executed, and the processing for merging, triggered by S101, is finished.

In S107, the proposition unit 16 of the game management device 10 transmits a proposal for merging with the first group to the user terminal of the leader of the second group selected as a subject of merging by the leader of the first group (S107). Then, the user terminal of the leader of the second group displays these items of information (S108).

For example, a screen such as the one shown in FIG. 9 is displayed on the user terminal of the leader of the second group. The screen displays information concerning the group (first group) that has offered merging to the second group. Furthermore, the screen displays, as information concerning the group, the group name, the average level, the number of members at the current timing, the language used specified in the group entry condition, a link for browsing other detail information, etc. Note that the example screen is just an example, and other information concerning the group may be displayed.

Then, the user terminal of the leader of the second group accepts the input of a reply to the proposal mentioned above (S109). Then, the user terminal of the leader of the second group transmits the reply accepted to the game management device 10 (S110). In the case where the leader of the second group accepts merging with the group displayed, the leader of the second group replies to that effect. Meanwhile, in the case where the leader of the second group does not accept merging with the group displayed, the leader of the second group replies to that effect.

In the case where a reply to the effect of accepting merging with the first group has been accepted from the leader of the second group, the merging unit 17 of the game management device 10 performs processing for merging the first group and the second group to create a new single group (S111). Then, the merging unit 17 of the game management device 10 notifies the user terminal of the leader of the first group and the user terminal of the leader of the second group of the completion of merging (S112 and S113).

In the processing in S111, the merging unit 17 deletes the first group and the second group, which have been merged, from the group list (see FIG. 4), and registers the newly created single group in the group list. Then, the merging unit 17 let all of the members who have belonged to the first group and the members who have belonged to the second group belong to the newly created single group.

Furthermore, the merging unit 17 can register at least a portion (the group names, etc.) of the group attribute information of the first group and the second group in the group list in association with the newly created single group. In this case, the group search unit 13 described earlier performs the group search described earlier also with reference to group attribute information before merging. This makes it possible for the user to search for the group after merging on the basis of the group attribute information (the group names, etc.) of the groups before merging.

Furthermore, the merging unit 17 may create new group attribute information on the basis of at least a portion (the average levels, etc.) of the group attribute information of the first group and the second group, and may register the new group attribute information in the group list in association with the newly created single group. For example, the merging unit 17 may register the average of the average level of the first group and the average level of the second group as the average level of the newly created single group.

Note that, although not shown, in the case where a reply to the effect of not accepting merging with the first group has been accepted from the leader of the second group, the merging unit 17 does not perform processing for merging the first group and the second group.

"Operations and Advantages"

the game management device 10 according to this embodiment creates groups for participating in a play by using a method of creating tentative groups for each play. Furthermore, the game management device 10 creates groups by using a method of "mutually merging groups" in addition to a method of "participating in groups on a per-individual basis".

Here, as described with reference to FIG. 1, there has hitherto existed no technology for mutually merging dynamic groups. Thus, there has existed no technology in which a technology for entering dynamic groups on a per-user basis and a technology for mutually merging dynamic groups are combined.

The game management device 10 according to this embodiment, by utilizing the above-described technology, which has not hitherto existed, in the method of creating temporary groups on a per-play basis, realizes a reduction in the time taken before a desired number of members gather.

The greatest advantage of the game management device 10 according to this embodiment is that it becomes possible to apply "a function for merging groups", which has hitherto been implemented only for static groups, such as guilds, also to rooms, which are temporary, dynamic groups.

Furthermore, the game management device 10 according to this embodiment makes it possible to reduce matching time (user gathering time) in a multiplayer play. With existing games, the only method that has been applicable, for example, was to repeat invitations via SNSs or in-game chats until a specified number of members in a multiplayer play is reached. The game management device 10 according to this embodiment enables an operation for "merging with a larger group", which drastically increases the speed of satisfying the specified number of members.

Furthermore, the game management device 10 according to this embodiment realizes a superior feature of having high compatibility. The game management device 10 according to this embodiment can be implemented as "an additional function for rooms", without destroying an existing guild system, friend system, or room system. Users can enjoy room merging (group merging) realized by the game management device 10 according to this embodiment, while directly applying operational features of existing rooms.

Furthermore, the game management device 10 according to this embodiment realizes a superior feature of the ease of implementation. Since the game management device 10 according to this embodiment does not require any special implementation on the client side and can be implemented as simple queries to a database on the server side, the cost of introduction is low.

Second Embodiment

A game management device according to this embodiment has a function for locking a plurality of groups for which processing for merging is being executed, thereby moderating "the problem that other merging is executed in addition to the merging being executed, whereby the number of members of the group after merging exceeds the upper limit set in the game". A detailed description will be given below.

The merging unit 17 identifies groups to be chosen as the subjects of locking, and registers the identified groups as the subjects of locking. Furthermore, the merging unit 17 identifies groups to be unlocked, and unlocks the identified groups.

The groups registered as the subjects of locking are excluded, for example, from the subjects of searching by the group search unit 13.

Furthermore, the groups registered as the subjects of locking are excluded, for example, from the subjects of processing by the member addition unit 14. For example, the exclusion from the subjects of the processing by the member addition unit 14 is effective in cases like the following.

An example is the case where a group that is included in the result of searching by the group search unit 13, performed immediately before the group is registered as a subject of locking, and that is presented to the user is then registered as a subject of locking, and then a user performs an input for applying for the entry into the group. In this case, at the timing when the user performs an input for applying for the entry into the group, the group is already registered as a subject of locking. Thus, the member addition unit 14 does not execute processing for letting the user enter the group. In this case, a message may be presented to the user, such as: "Sorry but the selected group has been locked, not allowing entry".

Furthermore, the groups registered as the subjects of locking are excluded, for example, from the subjects of searching by the merging-subject search unit 15.

Furthermore, the groups registered as the subjects of locking are excluded, for example, from the processing by the proposition unit 16 and the processing by the merging unit 17. For example, the exclusion from the subjects of the processing by the proposition unit 16 and the processing by the merging unit 17 is effective in cases like the following.

An example is the case where a group that is included in the result of searching by the merging-subject search unit 15, performed immediately before the group is registered as a subject of locking, and that is presented to the leader of a group as a subject of merging is then registered as a subject of locking, and then a user performs an input for an offer of merging with the group. In this case, at the timing when the user performs an input for an offer of merging with the group, the group is already registered as a subject of locking. Thus, the proposition unit 16 does not execute processing for proposing, to the group to which merging has been offered, merging with that group. Furthermore, the merging unit 17 does not execute for merging the group with the group to which merging has been offered. In this case, a message may be presented to the user, such as: "Sorry but the selected group has been locked, not allowing merging".

An example flow of the processing will be described below in more detail with reference to a sequence chart in FIG. 10. Note that descriptions will be omitted, as appropriate, for processing that is the same as the processing described with reference to the sequence chart in FIG. 7.

First, the leader of the first group, which is a recruiting group, enters, via the user terminal, an instruction for searching groups that can be merged (S201). In response to the instruction entered, the game management device 10 searches for groups that can be merged with the first group (S202).

Next, the game management device 10 transmits the result of searching in S202, as well as a proposal for merging with "the groups that can be merged with the first group", indicated in the result of searching, to the user terminal of the leader of the first group (S203). Then, the user terminal of the leader of the first group displays these items of information (S204). For example, a screen such as the one shown in FIG. 8 is displayed on the user terminal of the leader of the first group.

Then, the user terminal of the leader of the first group accepts the input of a reply to the proposal mentioned above (S205). Then, the user terminal of the leader of the first group transmits the reply accepted to the game management device 10 (S206). In the case where the leader of the first group wishes for merging with one of the groups displayed in the list, the leader of the first group selects that group, and performs an input for an offer of merging with the group. Meanwhile, in the case where the leader of the first group does not wish for merging with any one of the groups displayed in the list, the leader of the first group performs an input to that effect.

Figure 10:
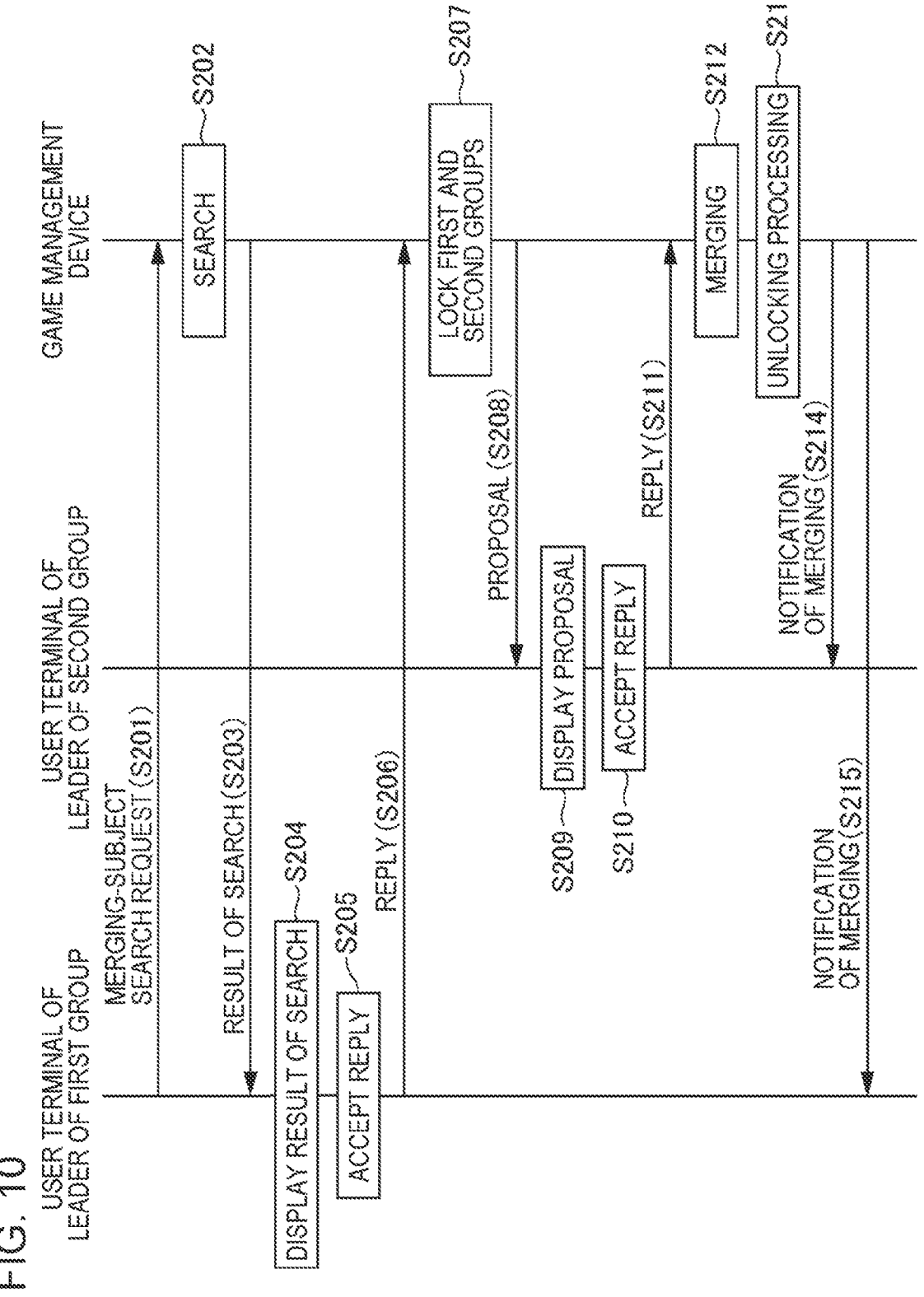
FIG. 10 is a sequence chart showing an example flow of processing by a game management device according to this embodiment.

Note that processing in and after S207 in FIG. 10 is processing in the case where the leader of the first group has performed an input for an offer of merging with one of the groups displayed in the list in S205. In the case where the leader of the first group has performed an input to the effect of not wishing for merging with any one of the groups displayed in the list in S205, the processing in and after S207 is not executed, and the processing for merging, triggered by S201, is finished.

In S207, the game management device 10 registers the first group, as well as the second group selected as a subject of merging by the leader of the first group, as the subjects of locking (S207).

In S208, the game management device 10 transmits a proposal for merging with the first group to the user terminal of the leader of the second group (S208). Then, the user terminal of the leader of the second group displays these items of information (S209). For example, a screen such as the one shown in FIG. 9 is displayed on the user terminal of the leader of the second group.

Then, the user terminal of the leader of the second group accepts the input of a reply to the proposal mentioned above (S210). Then, the user terminal of the leader of the second group transmits the reply accepted to the game management device 10 (S211). In the case where the leader of the second group accepts merging with the group displayed, the leader of the second group replies to that effect. Meanwhile, in the case where the leader of the second group does not accept merging with the group displayed, the leader of the second group replies to that effect.

In the case where a reply to the effect of accepting merging with the first group has been received from the leader of the second group, the game management device 10 performs processing for merging the first group and the second group to create a new single group (S212). In the processing in S212, the game management device 10 deletes the first group and the second group, which have been merged, from the group list (see FIG. 4), and registers the newly created single group in the group list. As a result of deleting the first group and the second group from the group list, the first group and the second group become unlocked (S213). Note that the lock is not inherited by the newly created single group.

Then, the game management device 10 notifies the user terminal of the leader of the first group and the user terminal of the leader of the second group of the completion of merging (S214 and S215).

Note that, although not shown, in the case where a reply to the effect of not accepting merging with the first group has been accepted from the leader of the second group, the game management device 10 does not perform processing for merging the first group and the second group. In response to the acceptance of the reply, the game management device 10 unlocks the first group and the second group.

The configuration of the game management device 10 according to this embodiment is otherwise the same as that in the first embodiment.

The game management device 10 according to this embodiment realizes the same operations and advantages as the game management device 10 according to the first embodiment. Furthermore, the game management device 10 according to this embodiment makes it possible to execute control so as to lock, at a suitable timing, groups for which merging processing has started, thereby prohibiting the execution of merging other than the merging processing in progress. This makes it possible to moderate "the problem that other merging is executed in addition to the merging being executed, whereby the number of members of the group after merging exceeds the upper limit set in the game".

Modifications

First Modification

In what has been described above, merging processing is performed along the following flow: a request for searching for subjects of merging is accepted from a first group, groups that satisfy a merging condition with the first group are searched for in response to the request, merging with the groups found by the search is proposed to the first group, and merging is proposed to a second group on the basis of a reply from the first group.

As a modification, the game management device 10 may search for two or more groups that can be mutually merged from among recruiting groups at prescribed timings defined in advance (e.g., at prescribed time intervals), without accepting a request for searching for subjects of searching from one of the groups, and may propose mutual merging with the groups to those groups.

In the case of this modification, for example, screens such as those shown in FIGS. 11 and 12 are displayed on the user terminals of the leaders of the two or more groups that can be merged, found by the search. In the case of the examples in FIGS. 11 and 12, the group "group name: Cycyga" and the group "group name: Minmin" are found by the search as two or more groups that can be merged, and merging with each other is proposed to each of these groups.

In this case, in the case where a reply to the effect of accepting merging has been received from both groups, the merging unit 17 performs processing for merging those groups. Meanwhile, in the case where a reply to the effect of not accepting merging has been received from at least one of the groups, the merging unit 17 does not perform processing for merging those groups.

Note that, in the case of this modification, an effective period for the proposal may be specified, as shown in the upper right in the screens in FIGS. 11 and 12. Furthermore, in the case where a reply to the effect of accepting merging has not been received from both groups before the effective period for the proposal becomes zero, the merging unit 17 may cancel processing for merging those groups, invalidating the proposal. In this case, the merging unit 17 may register both groups as subjects of locking from the timing of proposing merging to those groups to the earliest one of "the timing at which the effective period for the proposal becomes zero", "the timing of accepting a reply to the effect of not accepting merging from at least one of the groups", and "the timing of completion of merging after accepting a reply to the effect of accepting merging from both groups".

Second Modification

In what has been described above, merging of groups is proposed to one member (leader) of each group; alternatively, the configuration may be such that merging is proposed to a plurality of members of each group. For example, at least one member to which the proposal is to be directed may be registered in advance for each group. Furthermore, in the case where a reply has been received from one of the at least one member registered as a target of the proposal, the game management device 10 may proceed with the subsequent processing while considering the reply as a reply from the group.

Third Modification

In what has been described above, it is presupposed that two groups are merged to create a single group; alternatively, three or more groups may be merged to create a single group. In this case, in a merging-subject search-result screen such as the one shown in FIG. 8, the user can select a plurality of groups and can offer merging to the plurality of groups. Note that control is executed so as to allow selection of a plurality of groups within a range in which the sum of the number of members of the group that offer merging and the number of members of the selected group does not exceed the upper limit set in advance in the game.

For example, Mu-kun in Cycyga, having received the result of searching for subjects of merging, such as the one shown in FIG. 8, can select, as the subjects of merging, the group "group name: Minmin" (hereinafter "Minmin") and the group "group name: Bananan" (hereinafter "Bananan") from among the plurality of groups displayed in the result of searching.

In this case, merging with Cycyga and Bananan is proposed to the leader of Minmin. Furthermore, merging with Cycyga and Minmin is proposed to the leader of Bananan. Furthermore, in the case where both the leader of Minmin and the leader of Bananan have replied to the effect of accepting the merging, these three groups are merged. In the case where at least one of the leader of Minmin and the leader of Bananan has not accepted the merging, these three groups are not merged.

Example

The following describes an example in which the game management device 10 described above is embodied more specifically. Note that the following example is just an example, and this embodiment is not limited to this example.

Overview

Figure 13:
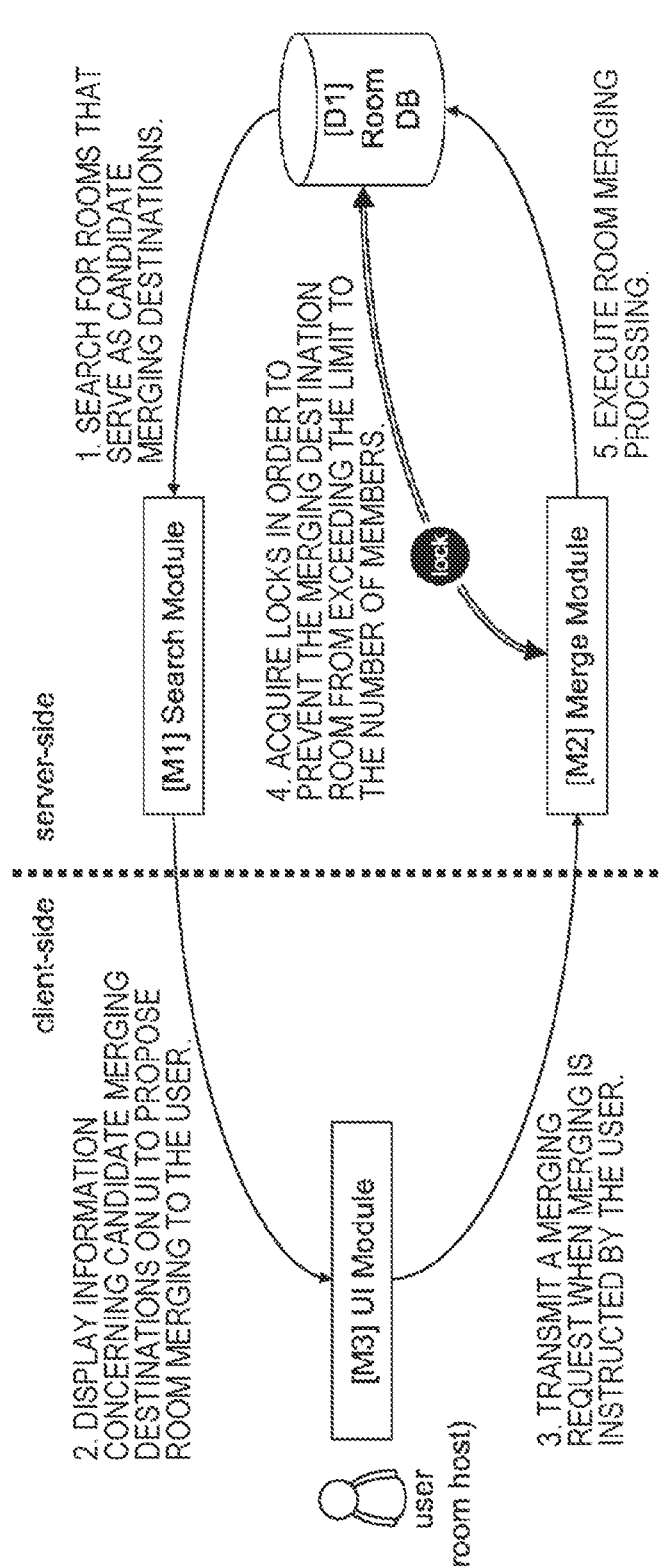
FIG. 13 is an example system configuration diagram according to this example.

FIG. 13 shows the system configuration according to this example. In this example, other rooms that serve as candidate merging destinations are recommended to the host user of a room (group) that does not satisfy a specified number of members for participation in a multiplayer play, and if there is a room with which the user wishes for merging, the two rooms are merged to create a new room. This example can be defined in terms of operations for searching a database for managing rooms and operations for updating the database. Room merging processing in this example is executed in the following manner.

(1) When the user has newly created a room and has started recruiting user, a client-side UI module ([M3] UI Module) of this system calls a search function of [M1] Search Module on the server side by using the current room as a parameter to search for rooms that serve as candidate merging destinations. [M1] Search Module searches [D1] Room DB for rooms that can be merged with the room received as a parameter, and returns the rooms to the client.

(2) The client-side module displays candidate merging destination information received from the server on the UI, and proposes room merging to the user. At this time, it is preferable to motivate the user to merge rooms by displaying the numbers of users in the rooms, level information, etc. in addition to the names of the merging destination rooms.

If the user wishes for room merging and has issued an instruction for merging to the client-side UI module, the client-side module transmits a merging request to [M2] Merge Module on the server side, the merging request including the room hosted by the user and the merging destination room as two parameters.

(4) [M2] Merge Module acquires locks from [D1] Room DB in order to prevent the merging destination room from exceeding the upper limit to the number of members. This lock mechanism prevents exceeding the upper limit to the number of members or the like as a result of multiplex merging of rooms. It is preferable, as an implementation, to exclude locked rooms from the result of searching by [M1] Search Module. Furthermore, in the case where real-time communication is possible, it is preferable that [M3] UI Module does not display locked rooms.

(5) [M2] Merge Module issues a data updating request to [D1] Room DB to create a new room containing all the users who belong to the two rooms, and executes merge processing. At this time, it is preferable to set the names or identifiers (IDs) of the two existing rooms as aliases of the newly created room.

—Data Structure—

The data structure lying at the core of this example is rooms. A room has an ID that is uniquely identifiable in the system, as well as a name or number legible to humans, and includes a plurality of users as members. At this time, generally, a single user is allowed to simultaneously participate only in one room. A room ("room") can be defined as in formula (1) given below.

[Math. 1]

$$room := [id, criteria, user_0, user_1, \ldots, user_n, alias_0, alias_1, \ldots, alias_m] \quad (1)$$

Here, "id" signifies an identifier for uniquely identifying a room within the system. "criteria" signifies a condition for users who can participate in this room (group entry condition): for example, a game-specific condition, such as a level or equipment, can be set. "$user_i$" signifies the identifier of the i-th user who belongs to the room, and "$alias_i$" signifies an alias assigned to the room. It is easier to gather users if it is possible, when rooms have been merged, to access the room created by merging by using the names before merging. Thus, it is preferable to allow each room to have the names of individual rooms before merging as aliases.

—Primitive Functions—

This example can be implemented in the form of a combination of the following three primitive functions.

(1) A function for searching for rooms that serve as candidates for merging. This function is expressed, for example, by formula (2) given below.

[Math. 2]

$$search(room, max) \rightarrow [room'_1, room'_2, \ldots, room'_n] \quad (2)$$

This function receives room information "room" constituting a query, searches for rooms that satisfy "criteria" of the "room" and with which the total number of members does not exceed "max" when the numbers of members in the two rooms are added together, and returns a list of such rooms. Note that it is preferred, as an implementation, to exclude rooms locked by a lock function, which will be described later, from the subjects of searching by the "search" function.

(2) A function for merging two "room"s. This function is expressed, for example, by formula (3) given below.

[Math. 3]

$$\text{merge}(\text{room}_1,\text{room}_2) \rightarrow \text{room'} | \text{member}(\text{room'}) = \text{member}(\text{room}_1) \cup \text{member}(\text{room}_2) \quad (3)$$

This function is a function that receives two "room"s and that merges the two "room"s to create "room'". At this time, letting the set of users who belong to "room" be signified by "member(room)", the members of the newly created room are represented by the union of the members of the two rooms given as the arguments. As an implementation of this example, although "id" of "room'" is newly created, it is preferable to save the "id"s or names of "room1" and "room2" before merging as aliases of "room'". Furthermore, conceivable methods of merging "criteria"s of "room"s include: "a method in which the stricter one of the criteria of the individual rooms is adopted"; "a method in which looser one of the criteria of the individual rooms is adopted"; "a method in which the "criteria" of the room to which merging has been offered is adopted"; and "a method in which "criteria" is newly determined by the user at the time of merging".

(3) A function for locking specific "room"s. This function is expressed, for example, by formula (4) below.

[Math. 4]

$$\text{lock}(\text{room}_1,\text{room}_2) \rightarrow \text{success} | \text{fail} \quad (4)$$

This function is a function that receives two "room"s and that acquires locks from users who belong to other groups in order to prohibit reference to and updating of the corresponding rooms. This lock mechanism prevents exceeding the upper limit to the number of members or the like as a result of multiplex merging of rooms. In the case of a failure to acquire both of the locks for the two rooms, all the locks are released, and "fail" is returned. "success" is returned only when both of the locks for the two rooms have been acquired successfully.

Example reference modes are appended below.

1. A game management device including:

a storage unit that stores a list of a plurality of groups constituted of one or more members;

a merging-subject search unit that searches for two or more of the groups that satisfy a merging condition and that can be mutually merged from among the groups with which the numbers of members have not reached an upper limit set in advance in a game and that are in a state in which it is possible to add a member;

a proposition unit that presents a proposal for merging to the two or more groups that can be mutually merged and that accepts replies to the proposal; and a merging unit that merges the two or more groups that can be mutually merged to generate the single group in the case where replies to the effect of accepting the proposal have been received from the two or more groups that can be mutually merged.

2. A game management device according to 1, wherein:

a group entry condition for becoming a member is defined for each of the groups; and the merging condition is defined by using the group entry condition.

3. A game management device according to 1, wherein the merging condition is defined by using user attributes of members who belong to the groups.

4. A game management device according to any one of 1 to 3, wherein the merging condition includes a condition that the sum of the numbers of members who belong to the mutual groups is less than or equal to an upper limit.

5. A game management device according to any one of 1 to 4, wherein:

the storage unit stores the list in which group attribute information is associated with each of the plurality of groups;

the merging unit in the case where two or more of the groups have been merged, registers the single group after merging in the list, while deleting the two or more groups before merging from the list; and registers, in the list, the group attribute information of each of the two or more groups before merging in association with the single group after merging.

6. A game management device according to 5, further including a group search unit that, with reference to the group attribute information registered in the list, searches for the groups matching a search condition from among the groups registered in the list.

7. A game management device according to any one of 1 to 6, wherein:

there is an upper limit to the number of members in the groups, the merging-subject search unit searches for one or more of the groups that can be merged with a first group, which is one of the groups with which the numbers of members have not reached the upper limit set in advance in the game and that is in a state in which it is possible to add a member;

the proposition unit proposes, to the first group, the one or more groups found by searching as the groups that can be merged, and accepts a reply indicating one or more selected therefrom as subjects of merging;

the merging unit, after receiving the reply for selecting the one or more groups from the first group, registers the first group and the one or more selected groups as subjects of locking, which cannot be merged with the other groups;

the proposition unit, after receiving the reply for selecting the one or more groups from the first group, proposes merging with the first group to the one or more selected groups, and accepts replies therefrom; and in the case where replies to the effect of accepting merging with the first group have been received from the one or more selected groups, the merging unit merges the first group and the one or more selected groups.

8. A game management method wherein a computer:

stores a list of a plurality of groups constituted of one or more members;

searches for two or more of the groups that satisfy a merging condition and that can be mutually merged from among the groups with which the numbers of members have not reached an upper limit set in advance in a game and that are in a state in which it is possible to add a member;

presents a proposal for merging to the two or more groups that can be mutually merged, and accepts replies to the proposal; and merges the two or more groups that can be mutually merged to generate the single group in the case where replies to the effect of accepting the proposal have been received from the two or more groups that can be mutually merged.

9. A program for causing a computer to function as:

a storage means for storing a list of a plurality of groups constituted of one or more members;

a merging-subject search means for searching for two or more of the groups that satisfy a merging condition and that can be mutually merged from among the groups with which the numbers of members have not reached an upper limit set in advance in a game and that are in a state in which it is possible to add a member;

a proposition means for presenting a proposal for merging to the two or more groups that can be mutually merged and for accepting replies to the proposal; and a merging means for merging the two or more groups that can be mutually merged to generate the single group in the case where replies to the effect of accepting the proposal have been received from the two or more groups that can be mutually merged.

This application claims priority based on Japanese Patent Application No. 2021-043722 filed 17 Mar. 2021, and the entire disclosure thereof is incorporated herein.

REFERENCE SIGNS LIST

1A Processor
2A Memory
3A Input/output interface
4A Peripheral circuit
5A Bus
10 Game management device
11 Storage unit
12 Group addition unit
13 Group search unit
14 Member addition unit
15 Merging-subject search unit
16 Proposition unit
17 Merging unit

The invention claimed is:

1. A game management device comprising:

a storage unit that stores a list of a plurality of groups constituted of one or more members;

a merging-subject search unit that searches for two or more groups of the plurality of groups that satisfy a merging condition and that can be mutually merged from among the plurality of groups with which a number of members have not reached an upper limit set in advance in a game and that are in a state in which it is possible to add a member;

a proposition unit that presents a proposal for merging to the two or more groups that can be mutually merged and that accepts replies to the proposal; and a merging unit that merges the two or more groups that can be mutually merged to generate a single group in response to receiving replies to an effect of accepting the proposal from the two or more groups that can be mutually merged, wherein the storage unit stores the list in association with group attribute information with each group of the plurality of groups, and wherein the merging unit:

registers, in response to the two or more groups being merged, the single group in the list while deleting the two or more groups from the list, and registers, in the list, the group attribute information of each group of the two or more groups in association with the single group after merging.

2. The game management device according to claim 1, wherein:

a group entry condition for becoming a member is defined for each group of the plurality of groups; and the merging condition is defined by using the group entry condition.

3. The game management device according to claim 1, wherein the merging condition is defined by using user attributes of members who belong to the plurality of groups.

4. The game management device according to claim 1, wherein the merging condition includes a condition that a sum of a number of members who belong to mutual groups is less than or equal to an upper limit.

5. The game management device according to claim 1, further comprising a group search unit that, with reference to the group attribute information registered in the list, searches for a set of the plurality of groups matching a search condition from among the plurality of groups registered in the list.

6. The game management device according to claim 1, wherein:

there is an upper limit to the number of members in the plurality of groups, the merging-subject search unit searches for one or more groups of the plurality of groups that can be merged with a first group, which is one of the plurality of groups with which the number of members have not reached the upper limit set in advance in the game and that is in a state in which it is possible to add a member;

the proposition unit proposes, to the first group, the one or more groups found by searching as the groups that can be merged, and accepts a reply indicating one or more selected therefrom as subjects of merging;

the merging unit, after receiving the reply for selecting the one or more groups from the first group, registers the first group and the one or more selected groups as subjects of locking, which cannot be merged with other groups among the plurality of groups;

the proposition unit, after receiving the reply for selecting the one or more groups from the first group, proposes merging with the first group to the one or more selected groups, and accepts replies therefrom; and in response to receiving replies to an effect of accepting merging with the first group from the one or more selected groups, the merging unit merges the first group and the one or more selected groups.

7. A game management method comprising:

storing, by a computer, a list of a plurality of groups constituted of one or more members;

searching, by the computer, for two or more groups of the plurality of groups that satisfy a merging condition and that can be mutually merged from among the plurality of groups with which a number of members have not reached an upper limit set in advance in a game and that are in a state in which it is possible to add a member;

presenting, by the computer, a proposal for merging to the two or more groups that can be mutually merged, and accepts replies to the proposal;

merging, by the computer, the two or more groups that can be mutually merged to generate a single group in response to receiving replies to an effect of accepting the proposal from the two or more groups that can be mutually merged;

storing, by the computer, the list in association with group attribute information with each group of the plurality of groups;

registering, by the computer and in response to two or more of the groups being merged, the single group in the list while deleting the two or more groups from the list; and registering, by the computer and in the list, the group attribute information of each of the two or more groups in association with the single group after merging.

8. A nontransitory computer readable medium comprising a program that, when executed by a computer, is configured to perform a method comprising:

storing a list of a plurality of groups constituted of one or more members;

searching for two or more groups of the plurality of groups that satisfy a merging condition and that can be mutually merged from among the plurality of groups with which a number of members have not reached an upper limit set in advance in a game and that are in a state in which it is possible to add a member;

presenting a proposal for merging to the two or more groups that can be mutually merged and for accepting replies to the proposal;

merging the two or more groups that can be mutually merged to generate a single group in response to receiving replies to an effect of accepting the proposal from the two or more groups that can be mutually merged;

storing the list in association with group attribute information with each group of the plurality of groups;

registering, in response to two or more of the groups being merged, the single group in the list while deleting the two or more groups from the list; and registering, in the list, the group attribute information of each of the two or more groups in association with the single group after merging.

* * * * *